Patented Jan. 29, 1929.

1,700,608

UNITED STATES PATENT OFFICE.

EDWARD H. BRUNE, OF ST. LOUIS, MISSOURI.

PROCESS FOR TREATING GARBAGE.

No Drawing. Application filed September 25, 1926. Serial No. 137,824.

The present invention consists of a compound and method for treating garbage and embodies certain improvements in producing a compound which may be mingled with the garbage in a facile manner not only to negative the malodors arising from the garbage but likewise increase the food value of the latter, especially for hogs, and to reduce the very fatty acids to a minimum, accordingly decreasing the grain consumption of the hogs.

Another object of the invention is to provide a powdered compound, which, when sprayed on the garbage, absorbs moisture and embodies chemical properties which prevent fermentation and makes the garbage less repulsive to handle in addition to increasing the bone and muscle building characteristics of the garbage.

A further object of the invention is to provide a compound which is admixed with the garbage in order to assimilate iron particles and to increase the quantities of lime which may be consumed by the hogs, at the same time providing a balanced ration which hardens the flesh and reduces the grain ration to a minimum.

Further objects of the invention will be apparent from a consideration of the following specification:—

In my previous application, filed September 5, 1925, Serial No. 54,819, I have described a process for treating green city garbage which embodies the treatment of the garbage with a certain species of hydrated lime in order to sweeten the garbage, increase the food value thereof and increase the fertilizer value of the hog feces. I am aware that prior to that time lime has been mixed with grain but am unaware of the prior use of the treatment of green city garbage with a certain species of lime, and the present application is designed as an improvement on the foregoing application for the purpose of further increasing the food value of the green city garbage and assimilating large amounts of iron and lime, producing a better food with obvious beneficial results.

The present invention embodies the mingling first of one pound of iron sulphate or copperas with eighteen pounds of water, after which one hundred pounds of fresh and active oxide of lime is added and placed in a closed container. These ingredients are agitated in the container until a pulverulent residue is obtained. The powdered residue is then introduced into a sprayer and is ejected therefrom under pressure on to the garbage. The sprayer nozzle may be manually controlled to effect proper distribution of the compound and while the compound is being sprayed on the garbage the latter is constantly agitated thereby effecting proper admixture of the compound and the garbage. The dry powder for the most part absorbs the moisture in the garbage and subdues the malodors arising from the latter to make the handling of the latter irrepulsive. In addition the garbage is sweetened and relatively large quantities of iron and lime assimilated so as to effect the healthy growth of the hogs and eliminate fatty acids. It has been found that green city garbage treated in this manner may be fed in large quantities to the hogs resulting in the healthy growth of the latter. Moreover, in cases where fat formation has already set in garbage treated with the present compound eliminates the soft oily fat and produces a firm solid fat and flesh.

It is of course to be understood that the proportion of iron sulphate, water and oxide of lime may be varied in order to conform to changes in conditions of the garbage as well as changes in the condition of the hogs. However, the proportions herein set out may be used to effect the results herein stated.

What I claim is:—

1. A compound for treating green city garbage including the mixture of iron sulphate, oxide of lime and water.

2. A compound for deodorizing garbage and increasing the food value thereof for animals, including a mixture of one part of iron sulphate, eighteen parts of water and one hundred parts of oxide of lime.

3. The method of treating garbage to deodorize it and make it usable as a stock feed which comprises sprinkling a pulverulent composition comprising hydrated lime and iron sulphate, the latter being present in lesser proportion.

In testimony whereof I affix my signature.

EDWARD H. BRUNE.